(12) United States Patent
Muhammad (10) Patent No.: US 10,648,494 B1
(45) Date of Patent: May 12, 2020

(54) WALKING ASSIST SYSTEM AND DETACHABLE MOBILE ASSIST BENCH

(71) Applicant: Mikhail Muhammad, Southfield, MI (US)

(72) Inventor: Mikhail Muhammad, Southfield, MI (US)

(*) Notice: Subject to any disclaimer, the term of this patent is extended or adjusted under 35 U.S.C. 154(b) by 0 days.

(21) Appl. No.: 16/251,977

(22) Filed: Jan. 18, 2019

(51) Int. Cl.
| | |
|---|---|
| A61H 3/00 | (2006.01) |
| A47C 4/28 | (2006.01) |
| F16B 2/22 | (2006.01) |
| A47C 4/38 | (2006.01) |
| A47C 4/48 | (2006.01) |
| F16B 7/04 | (2006.01) |
| F16L 3/08 | (2006.01) |

(52) U.S. Cl.
CPC ............. *F16B 2/22* (2013.01); *A47C 4/283* (2013.01); *A47C 4/38* (2013.01); *A47C 4/48* (2013.01); *A61H 3/00* (2013.01); *A61H 2201/1633* (2013.01); *F16B 7/044* (2013.01); *F16B 7/0433* (2013.01); *F16L 3/085* (2013.01)

(58) Field of Classification Search
CPC .. A47C 4/28; A47C 4/283; A47C 4/48; A47C 4/50; A47C 4/38; A47C 4/40; A47C 9/10
See application file for complete search history.

(56) References Cited

U.S. PATENT DOCUMENTS

| | | | | |
|---|---|---|---|---|
| 3,895,839 A | * | 7/1975 | Amato | A47C 3/32 |
| | | | | 297/4 |
| 3,913,598 A | * | 10/1975 | Glutting, Jr. | E04H 1/1205 |
| | | | | 135/152 |
| 4,748,994 A | * | 6/1988 | Schultz | A61H 3/04 |
| | | | | 135/67 |
| 4,907,839 A | * | 3/1990 | Rose | A61H 3/00 |
| | | | | 135/67 |
| 5,280,800 A | | 1/1994 | Pirrallo | |

(Continued)

OTHER PUBLICATIONS

Author Unknown, "Ultra Small Folding Chair—Super Strong, holds up to 300lbs!—Compact and Lightweight w/Storage Bag for Camping and Traveling," Apr. 18, 2018, https://www.accessorygeeks.com/n-rit-red-black-small-nano-folding-compact-chair-storage-bag.html.

(Continued)

*Primary Examiner* — David R Dunn
*Assistant Examiner* — Danielle Jackson
(74) *Attorney, Agent, or Firm* — Brooks Kushman, P.C.

(57) ABSTRACT

According to at least one example, a walking assist system includes a walker having a pair of laterally opposed upright tubular structures connected by at least one laterally-extending tubular portion. The walking assist system also includes a seating device having a first tubular structure formed in an inverted U—pivotably connected by a hinge mechanism to a second tubular structure formed in an inverted U-shape. The seating device also defines a stowed configuration and a deployed configuration. The walking assist system further includes a retention clip defining a first opposing end configured to removably clamp to at least one of an upright tubular structure and the laterally-extending tubular portion of the walker. The retention clip also defines a second opposing end configured to removably clamp to at least one tubular structure of the seating device.

20 Claims, 4 Drawing Sheets

(56) References Cited

U.S. PATENT DOCUMENTS

| | | | | |
|---|---|---|---|---|
| 5,353,824 A * | 10/1994 | Woods | | A61H 3/00 135/66 |
| 5,414,950 A * | 5/1995 | Johnson, Sr. | | A01M 31/025 135/119 |
| 5,522,642 A * | 6/1996 | Herzog | | A47C 3/38 248/188.2 |
| 5,882,067 A * | 3/1999 | Carbajal | | A61H 3/00 135/67 |
| 5,904,168 A | 5/1999 | Alulyan | | |
| 6,371,142 B1 * | 4/2002 | Battiston | | A61H 3/04 135/66 |
| 7,021,324 B1 * | 4/2006 | Clay | | A61H 3/04 135/66 |
| 7,828,377 B2 * | 11/2010 | Grace | | A47C 4/283 297/16.2 |
| 8,714,170 B1 * | 5/2014 | Bonne | | A45B 3/00 135/66 |
| 9,055,847 B1 * | 6/2015 | Flannery | | A47K 3/064 |
| 9,895,283 B1 | 2/2018 | Gimblet | | |
| 10,159,783 B2 * | 12/2018 | Kluttz | | A61M 5/1418 |
| 2003/0070702 A1 | 4/2003 | Ownes | | |
| 2005/0098695 A1 * | 5/2005 | Hollenbeck | | A61H 3/0244 248/229.26 |
| 2009/0102248 A1 * | 4/2009 | Grace | | A47C 4/283 297/16.2 |
| 2015/0001359 A1 * | 1/2015 | Catchings | | F16M 11/041 248/220.22 |
| 2017/0332748 A1 * | 11/2017 | Kaplan | | A45B 1/04 |
| 2019/0038497 A1 * | 2/2019 | Bonis | | A61H 1/00 |

OTHER PUBLICATIONS

Price, Mike, "The 5 Best Shower Chairs," Product Reviews, Mar. 28, 2017, Caregiver University, https://www.rehabmart.com/post/the-top-5-shower-chairs-compared.

* cited by examiner

VIEW A

WALKING ASSIST SYSTEM AND DETACHABLE MOBILE ASSIST BENCH

TECHNICAL FIELD

The present disclosure relates to a walking assist system having a deployable seating device.

BACKGROUND

Walkers are generally provided to assist individuals with various degrees of walking disability in moving from location to location. Patients having limited walking ability may rely on a walker to assist with walking exercises associated with physical therapy. While using a standard walker, if exhaustion, pain or other conditions inhibiting further walking occur prior to the patient arriving at a desired location, the patent may become unstable. In this case the patent may be required to rely on a physical therapist to hold the patient up or gently guide the patient to the ground to allow time for the therapist to retrieve other means to transport the patient without requiring additional walking.

SUMMARY

According to at least one example, a walking assist system includes a walker having a pair of laterally opposed upright tubular structures connected by at least one laterally-extending tubular portion. The walking assist system also includes a seating device having a first tubular structure formed in an inverted U-shape pivotably connected by a hinge mechanism to a second tubular structure formed in an inverted U-shape. The seating device also defines a stowed configuration and a deployed configuration. The walking assist system further includes a retention clip defining a first opposing end configured to removably clamp to at least one of an upright tubular structure and the laterally-extending tubular portion of the walker. The retention clip also defines a second opposing end configured to removably clamp to at least one tubular structure of the seating device.

According to at least one example, a seating device for removably attaching to a walker includes a first tubular structure formed in an inverted U-shape having laterally opposed upright portions connected by a cross member and a second tubular structure also formed in an inverted U-shape having laterally opposed upright portions connected by a cross member. The seating device also includes a hinge mechanism pivotably connecting at least one upright portion of the first tubular structure to at least one upright portion of the second tubular structure. The seating device further includes a flexible seating portion disposed about the cross member of each of the first and second tubular structures. The seating device still further includes at least one retaining clip defining a first end removably clamped to one of the first and second tubular structures. The retaining clip also defines a second end configured to removably clamp to a tubular structure of a walker in a stowed configuration.

According to at least one example, a seating device for removably attaching to a walker includes a pair of tubular structures hingedly attached to each other. The pair of tubular structures defines a generally flat stowed configuration and a deployed configuration having an open angle between a first tubular structure and a second tubular structure. The seating device also includes a seating surface disposed about an upper portion of each of the first and second tubular structures. The seating device further includes at least one retaining clip defining a first engagement clamp configured to removably snap fit to one of the first and second tubular structures. The retaining clip also includes a second engagement clamp configured to removably snap fit to a tubular structure of a walker.

According to more specific examples, the seating surface is formed from a flexible sheet material configured to fold in the stowed configuration and span between the first tubular structure and the second tubular structure in the deployed configuration thereby limiting the open angle.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
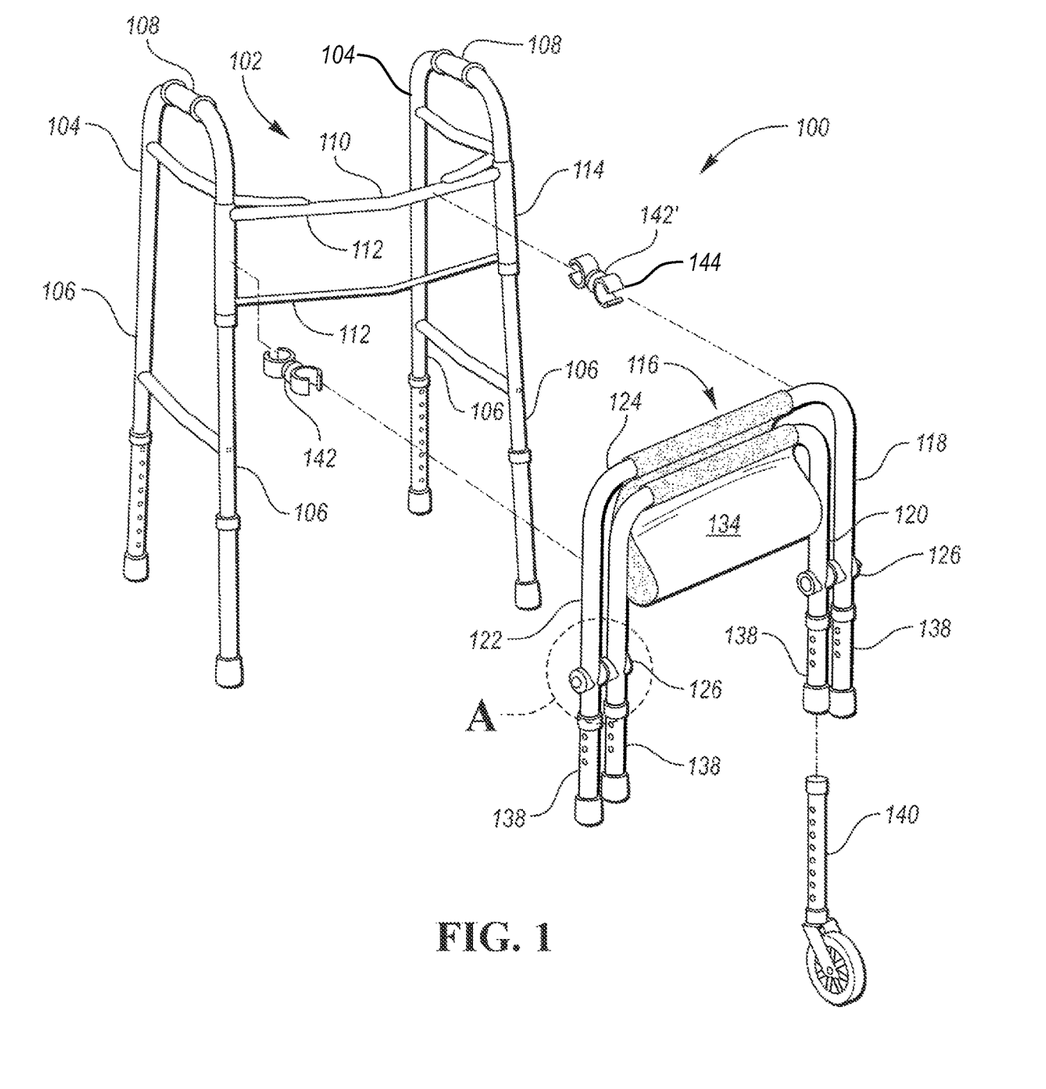
FIG. 1 is an exploded view of a walking assist system.

Referring to FIG. 1, a walker system 100 includes a walker 102 having a plurality of elongated structures to support a patient by providing added stability while walking. According to one example, a pair of opposing tubular support structures 104 are formed in an inverted "U" shape with generally vertical portions 106 connected to an upper horizontal portion 108. Each of the opposing tubular support structures 104 is connected by one or more laterally-extending cross members 110. In the example of FIG. 1, the cross member 110 comprises two tubular horizontal portions 112 connected to opposing upright sleeves 114. Each of the upright sleeves 114 is disposed about a vertical portion 106 of one of the opposing tubular support structures 104 to allow relative rotation to collapse the walker 102 towards a stowed configuration. According to some examples, there is a relative angle between the opposing upright sleeves 114 to provide increased lateral stability such that the laterally-opposing vertical portions 106 of the tubular support structures 104 are nonparallel when the walker is in a deployed configuration. It should be appreciated that the relative angle between the laterally-opposing upright components may vary by model and/or manufacturer of the particular walker.

Figure 2:
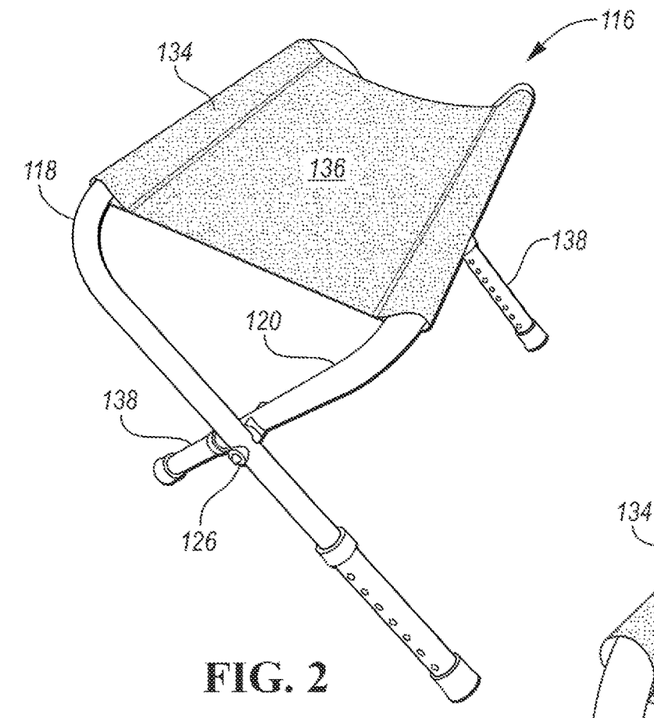
FIG. 2 is a perspective view of a seating device in a deployed configuration.
Figure 3:
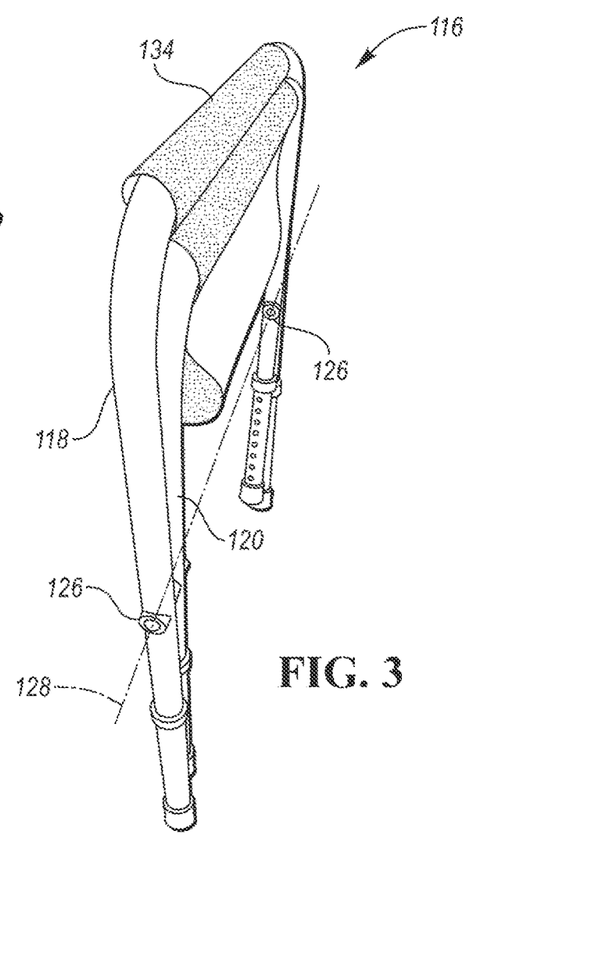
FIG. 3 is a perspective view of a seating device in a stowed configuration.

Referring collectively to FIGS. 1 through 3, the walker system 100 also includes a mobile seating device 116 configured to selectably attach to the walker 102 for stowage, and selectably detach from the walker 102 for deployment to allow a patient to sit on demand regardless of the present location. The seating device 116 includes a first tubular structure 118 pivotably connected to a second tubular structure 120. According to one example, each of the first tubular structure 118 and the second tubular structure 120 is formed into an inverted "U" shape having opposing upright portions 122 connected near an upper end by a cross member 124.

While tubular structures having round cross sections are presented herein by way of example, tubular structures having a variety of section shapes may be suitable according to the present disclosure. Moreover, the current walking assist system may accommodate differing cross section shapes between the walker structures and the seating device structures.

The seating device 116 is configured to articulate between a stowed configuration and a deployed configuration. As depicted in FIG. 1, the stowed configuration of the seating device allows the second tubular structure 120 to nest within the open portion of the "U" shape of the first tubular structure 118 such that the seating device 116 is generally flat when in the stowed configuration. The deployed configuration defines an open angle between the first tubular structure 118 and the second tubular structure 120.

The seating device also includes at least one hinge mechanism 126 pivotably connecting the first tubular structure 118 and the second tubular structure 120. The hinge mechanism 126 allows the seating device to articulate between the stowed configuration and the deployed configuration by pivoting the first and second tubular structures relative to each other about axis 128.

Figure 4:
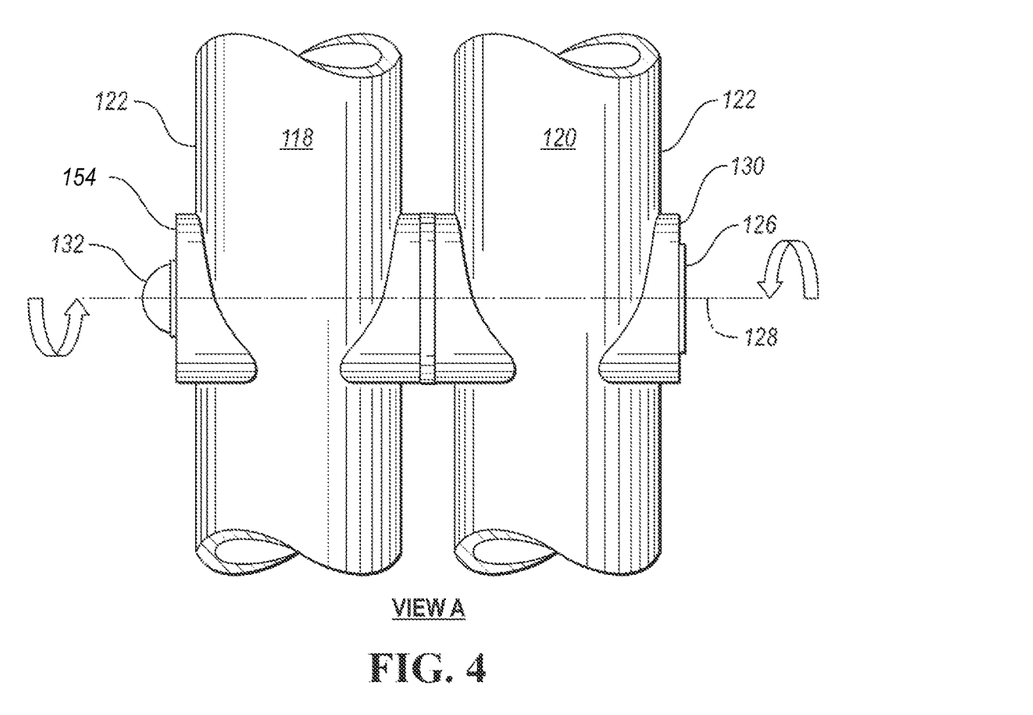
FIG. 4 is a partial view A of a hinge mechanism of the seating device.

Referring to FIG. 4, the hinge mechanism 126 may include a first securing portion 154 secured to the upright portion 122 of the first tubular structure 118. The hinge mechanism 126 may also include a second securing portion 130 secured to the upright portion 122 of the second tubular structure 120. The first securing portion 154 and the second securing portion 130 are configured to allow the tubular structures to pivot relative to each other. A pivot pin 132 is inserted through, and secures each of the securing portions to each other while still allowing for relative rotation. The hinge mechanism 126 may further include internal detent features (not shown) to define predetermined relative angular positions. In some examples, the internal detent features resist pivoting out of a predetermined fully stowed configuration and a predetermined fully deployed configuration. In this way, the seating device 116 may be held in the stowed configuration while transported without inadvertent deployment. It should be appreciated that additional predetermined positions may be defined by the hinge mechanism 126 as suitable hinge angles to hold the seating device in a desired position. In further examples, the hinge mechanism 126 may include an internal biasing member to bias the seating device toward one of the stowed configuration and the deployed configuration.

Referring back to FIGS. 1 through 3 collectively, the seating device 116 further includes a flexible seating portion 134 configured to support a patient while sitting. The seating portion 134 is adapted to conform to each of the stowed and deployed configurations of the seating device 116. The seating portion 134 comprises a pliable sheet material disposed about the cross member 124 of each of the first tubular structure 118 and the second tubular structure 120. According to at least one example, the seating portion may be constructed from a polymer coated fabric. In a more specific example, a woven polyester fabric is coated with polyvinylchloride (PVC) on both sides to provide a high-grade, tear-resistant, soil-resistant conforming seating surface. In further examples the sheet material of the seating portion 134 is wrapped about each cross member 124 and secured to itself. In this way, the seating portion 134 is folded and collapses when the seating device is in the stowed configuration depicted in FIGS. 1 and 3. Conversely, the seating portion 134 is extended to span between the opposing cross members 124 when the seating device 116 is in the deployed position (as depicted in FIG. 2) to provide a sitting surface 136 for a patient. In some examples the flexible seating surface while spanned in the deployed configuration limits the open angle between the tubular structures to define a fully open angle. In further examples, the seating portion may be formed as a rigid component and pivot to a substantially vertical orientation when the seating device is the stowed configuration. When deployed, a seating portion that is formed as a rigid component may pivot to a substantially horizontal orientation and rest on each of the cross members 124 to support a seated occupant.

The seating device further includes extension portions 138 disposed at a lower end of each upright portion 122. The extension portions 138 are configured to telescope relative to each upright portion 122 to adjust the height of the seating device 116 in the deployed configuration. The extension portions 138 are further configured to be easily detachable for replacement with an alternate extension. In the example of FIGS. 1 through 3, the extension portions 138 include a blunt end fitting to facilitate a stationary seating position of the seating device 116. In other examples, at least one wheeled extension 140 may be installed to replace the standard extension portions 138 to facilitate rolling of the seating device 116 such that a seated patient may roll from an initial seated location to a desired subsequent seating location while sitting. More specifically, the seated patient may be able to roll themselves to a desired location or be rolled by a medical profession. In this way, the patient requiring seating will not become stranded in a hallway or other walking location, but instead be conveniently transported back to a residential or examination room.

With continued reference to FIG. 1, the seating device 116 may be attached to the walker 102 while in the stowed configuration. According to some examples the seating device 116 is attached to the walker via one or more retaining clips 142. Each retaining clip 142 includes at least one flexible engagement clamp 144 to secure to any of the tubular structures of the walker 102 or the seating device 116. The engagement clamps 144 are sized to allow a user to snap fit a retaining clip 142 about any of the tubular structures with moderate hand pressure. More specifically, each engagement clamp 144 may have an elastic range of deformation so as to deflect during insertion about a tubular structure that is larger than a throat opening of the engagement clamp. Cantilevered portions of each engagement clamp 144 are deflected briefly during a joining operation, and once secured the respective tubular structure is then captured within the rounded undercut formation. After the joining operation, cantilevered portions of each engagement clamp 144 return to a stress-free condition. The retaining clips 142 are sufficiently loose while secured to rotate about a longitudinal axis of the tubular members to which they are attached. In this way, a user may easily attach the seating device 116 to a walker 102 for stowage by snap-fitting a first end of a retaining clip 142 to any of a number of the tubular structures of the seating device 116, and snap-fitting a second end of the retaining clip 142 to any of a number of the tubular structures of the walker 102. The configuration of the retaining clips provides a rapid way of securing the seating device to the walker with only hand pressure and without the need for tools.

Similarly, the snap fit connection of the retaining clip 142 may be detached from a tubular structure by a similar force in the opposing direction. Thus, the seating device 116 may be quickly detached from the walker 102 for deployment using only moderate hand pull pressure.

Figure 5:
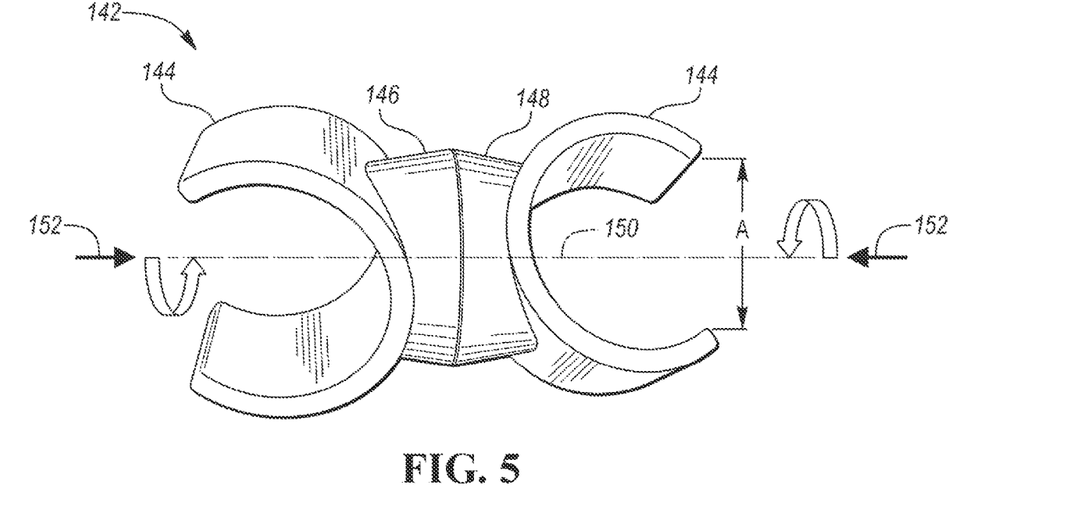
FIG. 5 is a perspective view of a retaining clip.

Referring to FIG. 5, the retaining clips 142 are articulable to allow relative movement between a first portion and a second portion. In the example of FIG. 5, a first end 146 freely pivots relative to a second end 148 about an axis 150 that is orthogonal to the longitudinal axes of the tubular structures to which the retaining clip is attached. The relative pivoting between the first end 146 and the second end 148 allows the retaining clip 142 to be easily secured to a pair of non-parallel tubular structures.

Each of the first end 146 and the second end 148 of the retaining clip 142 includes a flexible engagement clamp 144 configured to snap fit about a respective tubular member by forcing the clip along insertion direction 152. In the example of FIG. 5, the insertion directions 152 of each of the engagement clamps 144 oppose each other and converge toward a middle portion of the retaining clip 142. This configuration allows for the sitting device 116 to be assembled to the walker 102 by pressing the sitting device 116 against the walker 102 with a retaining clip 142 interposed between two of the tubular structures. As discussed above, each engagement clamp 144 includes a range of elastic deformation to deflect during insertion about a tubular structure that is larger than a throat opening dimension A. In some examples the engagement clamps 144 are formed from a polymer material that deforms briefly during a snap fit attachment and returns to an original undeformed shape for retention once secured. Other materials allowing for a range of elastic deformation may also be suitable to form either or both of the engagement clamps 144.

In the example of FIG. 5, the engagement clamps 144 include an identical shape corresponding to both of the first end 146 and second end 148 to allow the direction of the retaining clip to be reversible without affecting attachment to the walker. In this way, a user need not consider the direction of the clip during attachment of the seating device to a walker. In other examples, a first end of the retaining clip may include an engagement clamp that is uniquely-sized relative to an engagement clamp at an opposing second end. In this case, one of the first end and the second end may be specifically sized to retain to the seating device, and the other of the first end and the second end may be specifically sized to retain to the walker.

Referring back to FIG. 1, each vertical portion 106 of the opposing support structures 104 are non-parallel with respect to each other. The articulable configuration of the retaining clips 142 allow for easy connection by a user to any portion of the tubular support structure 104 or the upright sleeves 114. Similarly, the retaining clips 142 are capable of securing to a range of positions along any of the tubular horizontal portions 112 of the cross member 110. Since the walker 102 may be provided in a range of overall widths, the seating device 116 may not be as wide as the full width of the walker 102. In this case, it may be suitable to secure a first retaining clip between an upright portion 122 of the seating device 116 and an upright sleeve 114 of the walker 102. To provide a second securing point, it may be suitable to secure a second retaining clip 142' between cross member 124 of the seating device 116 and a tubular horizontal portion 112 of the walker 102. Due to the flexible connection of the retaining clips 142 across a range of locations along any of the tubular structures, the seating device 116 is easily retained to a wide array of different walkers having different widths and/or different angular orientation of tubular supports.

While the example above presented the seating device 116 as being capable of securing to a front portion of walker 102, it should be appreciated that the configurable retention system discussed herein also allows a user to removably secure the seating device to the either side of the walker 102 by securing to different respective tubular structures. Depending on the preference, the user may quickly attach and detach the seating device 116 from the walker 102 at a number of different locations without unnecessarily delaying an unstable walking patient. Similarly, the seating device 116 is compatible with any number of different walkers that may be in a user's inventory.

Figure 6:
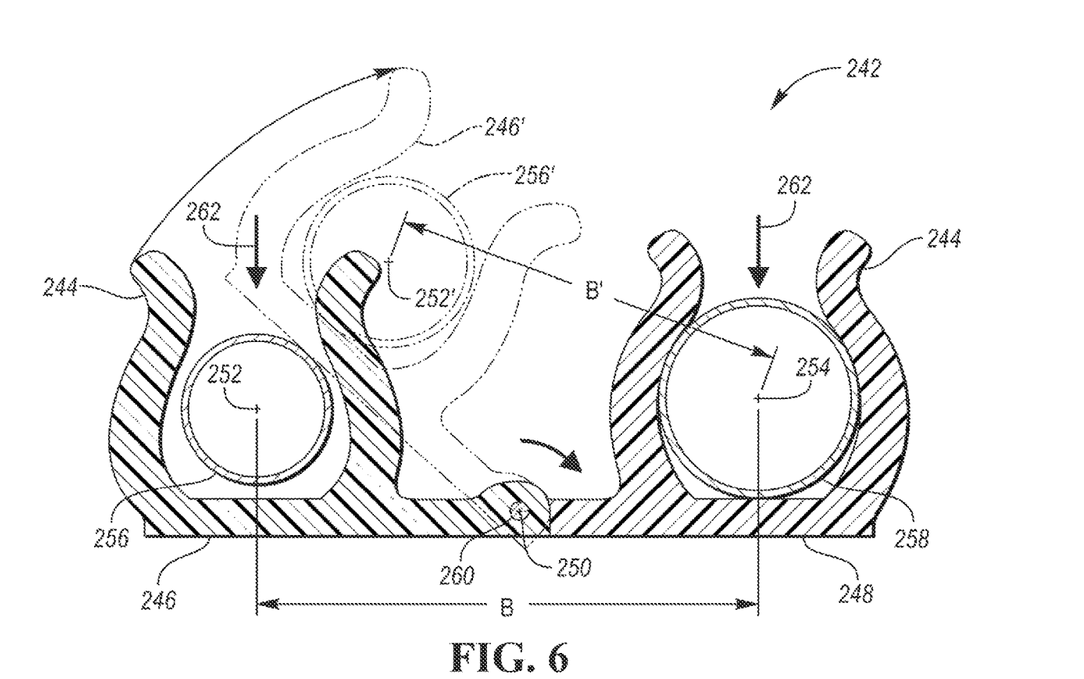
FIG. 6 is a cross section view of an alternate example retaining clip.

Referring to the cross section of FIG. 6, an alternative example retaining clip 242 is also articulable to accommodate a range of relative positions between two tubular structures. The view of the cross section is along longitudinal axes 252, 254 of tubular structures to which the retaining clip 242 is secured. In the example of FIG. 6, the tubular structures 256, 258 are generally parallel relative to each other, however it is envisioned that retaining clip 242 may still accommodate a range of angular misalignment. While retaining clip 242 is depicted as being formed from a polymer material, it may be suitable to form the clip from a metallic material or from a combination of metal and plastic materials.

Similar to previous examples, the articulation of retaining clip 242 aids in flexible and convenient locating of a seating device for attaching to any of a number of different walkers. The retaining clip 242 includes a first end 246 that freely pivots relative to a second end 248 about an axis 250. In the example of FIG. 6, axis 250 is generally parallel to longitudinal axes 252, 254 of the tubular members 256, 258, respectively, to which the retaining clip is attached. Each of the first end 246 and the second end 248 also include a flexible engagement clamp 244 to snap fit about a respective tubular member. The engagement clamps 244 may be attached by forcing a tubular member into a respective clamp along insertion direction 262. In this case the insertion directions 262 of each clamp are generally parallel to each other and oriented across the body of the retaining clip 242. This configuration may facilitate assembly of the sitting device 116 to the walker 102 where two tubular structures are positioned adjacent to each other and the retaining clip 242 is snapped onto both tubular structures by forcing the clip laterally onto both structures.

Although tubular members 256, 258 are uniquely-sized with respect to each other, engagement clamps 244 formed at either end of the retaining clip are identically-sized to allow reversal of the retaining clip such that its orientation does not affect assembly. However, it should be appreciated that further alternative examples may include engagement clamps that are uniquely-sized at opposing ends to specifically correspond to tubular structures of each of the seating device and walker, which may have differing sizes.

The retaining clip 242 also includes a hinge portion 260 to provide relative pivoting between the first end 246 and the second end 248. Shown in phantom in FIG. 6, position 246′ indicates a pivoted position of the first end 246. The position 246′ also corresponds to an alternate location 256′ of the first tubular member 256 and corresponding longitudinal axis 252. A distance B′ between axes 252′ and 254 is less in the pivoted position of the retaining clip relative to the distance B between axes 252 and 254 in the non-pivoted position of the retaining clip. Stated another way, pivoting of the retaining clip 242 shortens the distance between the axes of the two tubular members allowing the retaining clip to accommodate a range of relative spacing between two retained tubular structures. In practice, a seating device having a first lateral width may be easily secured to a walker having a second, different lateral width between upright tubular supports.

Figure 7:
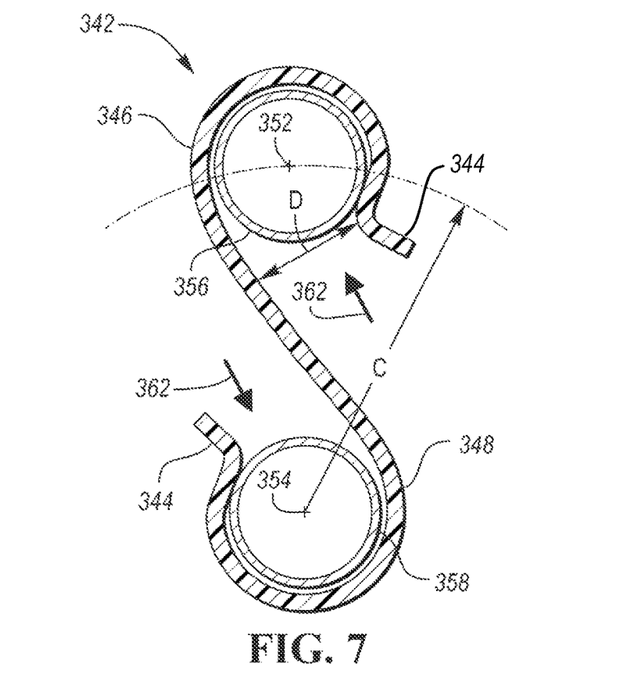
FIG. 7 is a cross section view of a further alternate example retaining clip.

Referring to FIG. 7, a third example retaining clip 342 is also articulable to accommodate a range of relative positions between two tubular structures. The view of the cross section is along longitudinal axes 352, 354 of tubular structures to which the retaining clip 342 is secured. In the example of FIG. 7 the tubular structures 356, 358 are generally parallel relative to each other, however it is envisioned that the retaining clip 342 may still accommodate a range of angular misalignment.

Each of the first end 346 and the second end 348 are fixed relative to each other, and the retaining clip 342 is free to pivot about longitudinal axes 352, 354 of the tubular structures even after being secured. In the example of FIG. 7, a distance C between axes 352 and 354 remains fixed.

The retaining clip 342 has a first end 346 and a second end 348 that each includes a flexible engagement clamp 344 to snap fit about a respective tubular member. Similar to previous examples, each engagement clamp 344 may have an elastic range of deformation so as to deflect during insertion about a tubular structure that is larger than a throat opening dimension D. The engagement clamps 344 may be attached by forcing a tubular member into respective clamp along insertion direction 362. In this example, the insertion directions 362 of each clamp are opposing and diverge from a center portion of the retaining clip 342.

The configuration of retaining clip 342 having a fixed tubular structure spacing and opposing diverging insertion directions allows for a unique assembly technique of the seating device 116 to the walker 102 relative to previous examples. One particular assembly advantage may stem from ease of insertion from "hanging" the seating device 116 onto a walker 102 by clipping a horizontal tubular structure of the seating to a horizontal member of the walker. In a specific example assembly sequence, a retaining clip 342 is secured to a cross member 124. Then the seating device 116 may be secured onto one of the horizontal portions 112 of walker 102 by pushing downward on the seating device to move it along insertion direction 362. The direction of assembly along the same direction as gravitational force may reduce the amount of hand pressure required to snap fit the retaining clips onto the tubular structures. Thus, a user may receive a gravity assist during assembly.

While the above examples describe easily removable snap fit configurations for attaching to both of the seating device and the walker, it may be desirable to provide a more permanent connection at one end of the retaining clips. In one specific example, retaining clips may be require significantly higher force to detach from the seating device. In this way, the clips are always ensured to remain with the seating device when deployed from a walker. Moreover, a seating device persistently equipped with retaining clips may always be compatible to attach to a range of different walkers on an on-the-fly basis. In practice, a medical professional may quickly and easily retrieve a seating device having pre-assembled retaining clips from available equipment inventory and stow it on any of a number of available standard walkers just prior to conducting walking exercises with a patient.

In further alternative examples, at least one end of the attachment clip may include an articulable cam lever to lock onto one of the cylindrical members. More specifically, a quick release skewer may be applied across an opening of one of the engagement clamps. A rod threaded on one end may be secured to a first prong of the engagement clamp on one side of the opening. An opposing end of the rod may be secured to a second prong of the engagement clamp on an opposite side of the opening. The opposing end of the rod includes a lever-operated cam assembly that shortens the opening distance when actuated. Thus actuating the cam lever creates tension in the rod and tightens the engagement clamp to increase clamp pressure about a cylindrical member to which the clamp is attached.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications. None of the claims or claim elements appended to this application, nor any claims issued therefrom, are intended to invoke 35 U.S.C. 112(f) unless the words "means for" or "step for" are explicitly used in the particular claim.

What is claimed is:

1. A walking assist system comprising:
   a walker having a pair of laterally opposed upright tubular structures connected by at least one laterally-extending tubular portion;
   a seating device having a first tubular structure formed in an inverted U-shape pivotably connected by a hinge mechanism to a second tubular structure formed in an inverted U-shape, the seating device defining a stowed configuration and a deployed configuration; and
   a retention clip defining a first opposing end configured to removably clamp to at least one of an upright tubular structure and the laterally-extending tubular portion of the walker and a second opposing end configured to removably clamp to at least one tubular structure of the seating device, wherein each of the first and second opposing ends are configured to snap fit about a corresponding tubular structure to self-retain the seating device to the walker via a detachment pull pressure greater than a weight of the seating device.

2. The walking assist system of claim 1 wherein the first opposing end of the retention clip is configured to rotate relative to the second opposing end about an axis that is generally orthogonal to a longitudinal axis of the at least one tubular structure of the seating device.

3. The walking assist system of claim 1, wherein the retention clip includes a flexible engagement clamp at each of the first and second opposing ends configured to snap fit about at least one of a tubular structure of the walker and a tubular structure of the seating device.

4. The walking assist system of claim 3 wherein each flexible engagement clamp defines an insertion direction to snap fit about the at least one tubular structure and the insertion direction of a first engagement clamp opposes the insertion direction of a second engagement clamp.

5. The walking assist system of claim 3 wherein each flexible engagement clamp defines an insertion direction to snap fit about the at least one tubular structure and the insertion direction of a first engagement clamp is generally parallel relative to the insertion direction of a second engagement clamp.

6. The walking assist system of claim 1 wherein the hinge mechanism includes at least one detent feature defining a set position corresponding to at least one of the stowed configuration and the deployed configuration.

7. The walking assist system of claim 1 wherein the seating device includes a flexible seating surface configured to fold in the stowed configuration and span between the first tubular structure and the second tubular structure to provide a sitting surface in the deployed configuration.

8. A seating device for removably attaching to a walker comprising:
a first tubular structure formed in an inverted U-shape having laterally opposed upright portions connected by a cross member;
a second tubular structure formed in an inverted U-shape having laterally opposed upright portions connected by a cross member;
a hinge mechanism pivotably connecting at least one upright portion of the first tubular structure to at least one upright portion of the second tubular structure;
a flexible seating portion disposed about the cross member of each of the first and second tubular structures; and
at least one retaining clip defining a first end removably clamped to one of the first and second tubular structures and a second end configured to removably clamp to a tubular structure of a walker in a stowed configuration, wherein each of the first end and the second end are pivotably secured to each other via a pair of mating concentric circular base portions.

9. The seating device of claim 8 wherein each of the first end and second end of the at least one retaining clip includes an engagement clamp configured to snap fit about one of the first tubular structure, second tubular structure, or the tubular structure of the walker.

10. The seating device of claim 9 wherein each engagement clamp defines an insertion direction to snap fit about at least one tubular structure and a first insertion direction of a first engagement clamp opposes a second insertion direction of a second engagement clamp.

11. The seating device of claim 10 wherein each of the first insertion direction and the second insertion direction are oriented to converge toward a middle portion of the at least one retaining clip.

12. The seating device of claim 8 wherein the first end of the at least one retaining clip is configured to rotate about the second end.

13. The seating device of claim 12 wherein the first end is rotatable relative to the second end about an axis oriented orthogonally to a longitudinal axis of one of the first tubular structure and the second tubular structure.

14. The seating device of claim 8 wherein the flexible seating portion is formed from a polymer coated fabric wrapped about the cross member of each of the first and second tubular structures.

15. A seating device for removably attaching to a walker comprising:
a pair of tubular structures hingedly attached to each other and defining a generally flat stowed configuration and a deployed configuration having an open angle between a first tubular structure of the pair and a second tubular structure of the pair;
a seating surface disposed about an upper portion of each of the first and second tubular structures; and
at least one retaining clip defining a first engagement clamp configured to removably snap fit to one of the first or second tubular structures and a second engagement clamp configured to removably snap fit to a tubular structure of a walker, wherein the at least one retaining clip defines a first opposing end and a second opposing end configured to snap fit about a corresponding tubular structure to self-retain the seating device to the walker via a detachment pull pressure greater than a weight of the seating device.

16. The seating device of claim 15 wherein the seating surface is formed from a flexible sheet material configured to fold in the stowed configuration and span between the first tubular structure and the second tubular structure to provide a sitting surface in the deployed configuration, wherein the seating surface spanned in the deployed configuration limits the open angle.

17. The seating device of claim 15 wherein each of the pair of tubular structures comprises an inverted U-shape having laterally opposed upright portions connected by a cross member.

18. The seating device of claim 15 wherein a first insertion direction of the first engagement clamp opposes a second insertion direction of the second engagement clamp.

19. The seating device of claim 15 the first engagement clamp is configured to rotate relative to the second engagement clamp.

20. The seating device of claim 19 wherein the first engagement clamp is rotatable relative to the second engagement clamp about an axis oriented orthogonally to a longitudinal axis of one of the first and second tubular structures.

* * * * *

UNITED STATES PATENT AND TRADEMARK OFFICE
CERTIFICATE OF CORRECTION

PATENT NO. : 10,648,494 B1  
APPLICATION NO. : 16/251977  
DATED : May 12, 2020  
INVENTOR(S) : Mikhail Muhammad Page 1 of 1

It is certified that error appears in the above-identified patent and that said Letters Patent is hereby corrected as shown below:

In the Claims

Column 10, Line 54, Claim 19:
After "The seating device of claim 15"
Insert --wherein--.

Signed and Sealed this
Twelfth Day of January, 2021

Andrei Iancu
*Director of the United States Patent and Trademark Office*